United States Patent [19]
Nakamura et al.

[11] Patent Number: 5,649,031
[45] Date of Patent: Jul. 15, 1997

[54] IMAGE INFORMATION PROCESSOR FOR PRODUCING HIGH-QUALITY OUTPUT IMAGE

[75] Inventors: Toshiaki Nakamura; Keisuke Nakashima, both of Hitachi; Kouzou Nakamura, Hitachiota; Shinichi Shinoda; Tatsuki Inuzuka, both of Hitachi, all of Japan

[73] Assignee: Hitachi, Ltd., Tokyo, Japan

[21] Appl. No.: 41,411

[22] Filed: Mar. 31, 1993

[30] Foreign Application Priority Data

Mar. 31, 1992 [JP] Japan ................... 4-076546

[51] Int. Cl.$^6$ ........................... G06K 9/40
[52] U.S. Cl. ............... 382/254; 382/263; 382/264
[58] Field of Search .................. 382/50, 54, 27, 382/263, 264, 260, 266, 254; 358/462, 454

[56] References Cited

U.S. PATENT DOCUMENTS

| | | | |
|---|---|---|---|
| 4,447,830 | 5/1984 | Stoffel | 358/462 |
| 4,554,593 | 11/1985 | Fox | 382/50 |
| 4,694,342 | 9/1987 | Klees | 382/54 |
| 5,031,227 | 7/1991 | Raasch et al. | 382/22 |
| 5,050,227 | 9/1991 | Furusawa et al. | 382/54 |
| 5,151,953 | 9/1992 | Landeta | 382/27 |
| 5,299,030 | 3/1994 | Kim | 358/462 |

FOREIGN PATENT DOCUMENTS 2-168771  6/1990  Japan.
2-292956  12/1990  Japan.

*Primary Examiner*—Yon J. Couso
*Attorney, Agent, or Firm*—Antonelli, Terry, Stout & Kraus, LLP

[57] ABSTRACT

An image information processor for producing a high-quality output image by emphasizing the contour portions of a character, a photograph and others and by preventing the generation of a Moiré patterns in a dot region, for preventing an increase in the amount of codes, and for making it unnecessary to set desired binarization processing for each original, is provided. The processor includes a unit for scanning the original to convert each pixel data into an electric signal, a unit for controlling the start of image processing, a filter for carrying out enhancement processing among a plurality of pixels arranged in oblique directions after smoothing processing has been carried out among a plurality of contiguous pixels arranged in scanning and traverse directions, and a unit for carrying out at least one of binarization and binarization capable of realizing pseudo tone expression. According to the above construction of the image information processor, a unit for preventing the generation of a Moiré pattern in the dot region of an original and for carrying out contour enhancement for the character/photograph region of the original can be formed of simple hardware capable of performing a high-speed operation, a clear binary output is obtained, and an increase in transmission time is prevented.

10 Claims, 8 Drawing Sheets

IMAGE INFORMATION PROCESSOR FOR PRODUCING HIGH-QUALITY OUTPUT IMAGE

BACKGROUND OF THE INVENTION

The present invention relates to an image reading apparatus suitable for use in facsimile terminal equipment, and more particularly to an improvement in picture quality of image information obtained by scanning an original matter.

Conventional facsimile terminal equipment is provided with two kinds of binarization units for carrying out binarization and pseudo gray scale processing, and a user selects one of two kinds of processing in accordance with an original to be read (refer to the instruction manual of Hitachi high-speed facsimile HIFAX 130M). The reason for this is as follows. In a case where the binarization processing is carried out, the tone of a halftone region on a photograph or the like cannot be expressed. On the other hand, in a case where the pseudo gray scale processing is carried out, it is impossible to reproduce a character or line in a satisfactory manner. Further, as to processing for improving the picture quality of image information, in order to prevent a character, a line, or the like from being destroyed or becoming light, contour enhancement processing is carried out for image information obtained by scanning an original. When the contour enhancement processing is carried out for a dot region, however, a Moiré pattern is often generated in a binary output. A method of preventing the generation of a Moiré pattern is proposed in a Japanese Patent Application Un-examined Publication JP-A-2-292,956. In this method, a dot region is detected to carry out smoothing processing for the dot region, and contour enhancement processing is carried out for regions other than the dot region. Thus, the generation of a Moiré pattern in the dot region is prevented, and the sharpness of characters is improved in a character region. Further, another method of preventing the generation of a Moiré pattern is proposed in a Japanese Patent Application Un-examined Publication JP-A-2-168,771. In this method, the smoothing processing is first carried out for image information, and then the contour enhancement processing is carried out. Thus, the generation of a Moiré pattern in a dot region is prevented, and the sharpness of a character is improved.

As mentioned above, in the conventional facsimile terminal equipment, one of two kinds of binarization processing is selected in accordance with the original used. Now, consider a case where an original, on which a dot region and a character region coexist, such as a newspaper is used. When the binarization processing is selected, the halftone of the dot region cannot be expressed, and moreover a Moiré pattern is generated in the dot region by the contour enhancement processing. On the other hand, when the pseudo gray scale processing is selected, each of a character and a thin line is output in a discontinuous form. In either binarization processing, a large number of black or white discrete pixels are generated which do not exist in the original. Thus, when a coding method for reducing the amount of information by paying attention to the continuity of pixels, for example, Modified Huffmann (MH) coding method or Modified Relative Element Address Designate (MR) coding method is used, there arise problems that the amount of code is increased and a transmission time is also increased.

Further, when the method of preventing the generation of a Moiré pattern by detecting a dot region is used to improve the picture quality of an output image, there arises a problem that an unclear image region such as a dot region including character information is misjudged, and thus an output image is deteriorated. In order to solve this problem, a large-scale, dot-region discriminating circuit is required. When the method of preventing the generation of a Moiré pattern is carried out, there arise the following problems. In the smoothing processing, the density values of pixels adjacent to a target pixel in horizontal, vertical and oblique directions are averaged. Accordingly, even when the contour enhancement processing is carried out for a thin line whose width is nearly equal to the width of one scanning line, the thin line cannot be restored. Further, in a case where a region including n pixels in a traverse direction is required for smoothing processing and a region including m pixels in a traverse direction is required for contour enhancement processing, a memory is necessary which can store image data corresponding to at least (m+n−1) lines.

SUMMARY OF THE INVENTION

It is an object of the present invention to provide an image information processor which can improve the picture quality of an output image by emphasizing the contour portions of a character, a photograph and the like, and by preventing a Moiré pattern from generating in a dot region, can prevent an increase in amount of code, and makes it unnecessary to set desired binarization processing for each original.

In order to attain the above object, according to the present invention, there is provided an image information processor which comprises means for scanning an original matter to convert each pixel data into an electric signal, means for controlling the start of image processing, a filter for carrying out enhancement processing among a plurality of adjacent pixels arranged in oblique directions, after smoothing processing has been carried out among a plurality of continuous pixels arranged in scanning and traverse directions (hereinafter referred to as "dot filter"), and means for carrying out binarization such as simple binarization and pseudo gray scale processing.

More specifically, according to the above image information processor, when an original matter is set at a predetermined position and the image processing is started, image information read out by the scanning means is applied to the dot filter. When the image information passes through the dot filter, a dot pattern, that is, a pattern, in which high-density pixels are arranged in a direction oblique with respect to a scanning direction, is subjected to smoothing processing, and a character, a line, or the like, that is, a pattern, in which high-density pixels are continuously arranged in a horizontal or vertical direction, is subjected to contour enhancement processing. The output of the dot filter is subjected to binarization processing or pseudo gray scale processing. As mentioned above, a dot region is subjected to the smoothing processing by the dot filter. Accordingly, no Moiré pattern is generated in the dot region. Further, the contour portions of a character, a line and the like are subjected to contour enhancement processing, and thus the character, the line and the like do not become light, are not destroyed, and do not get blurred. That is, a binary output capable of producing a high-quality image is obtained.

DESCRIPTION OF THE PREFERRED EMBODIMENTS

The present invention will be explained below in detail, with reference to the drawings.

Figure 1:
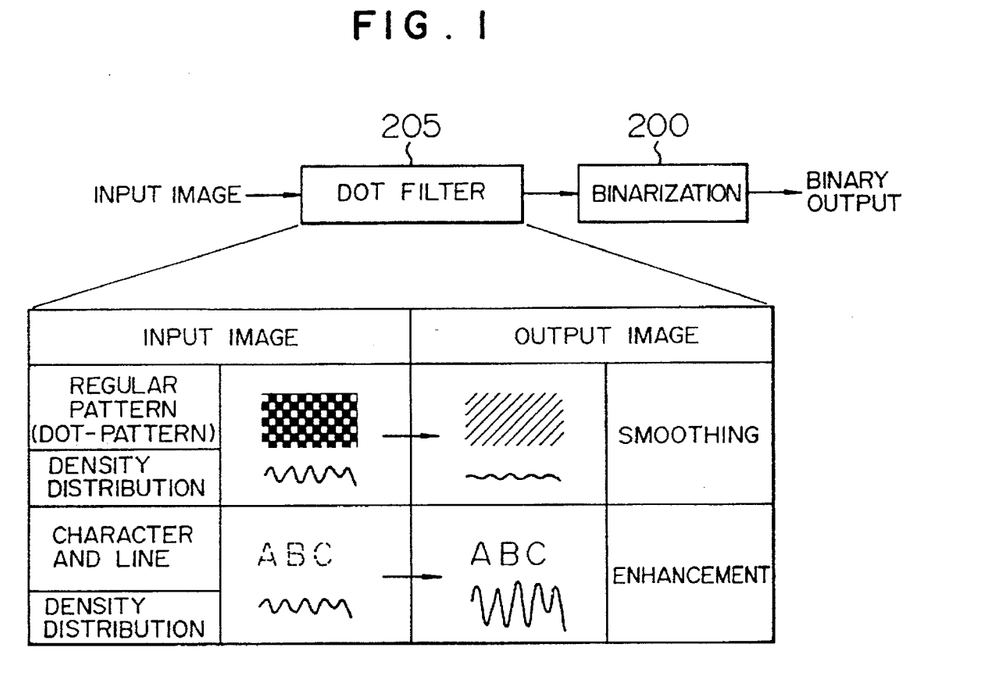
FIG. 1 is a diagram showing an embodiment of an image information processor according to the present invention.

FIG. 1 shows filter characteristics according to the present invention.

Referring to FIG. 1, when image information is applied to a dot filter 205, a region where high-density pixels are distributed discretely and regularly, for example, a dot region is subjected to smoothing processing, and a region where high-density pixels are continuously distributed, for example, a character or line is subjected to contour enhancement processing. As a result, not only is the generation of a Moiré pattern due to binarization unit 200 prevented, but also the character or line is prevented from becoming light, being destroyed, or getting blurred on the basis of the processing of the binarization unit 200.

Figure 2:
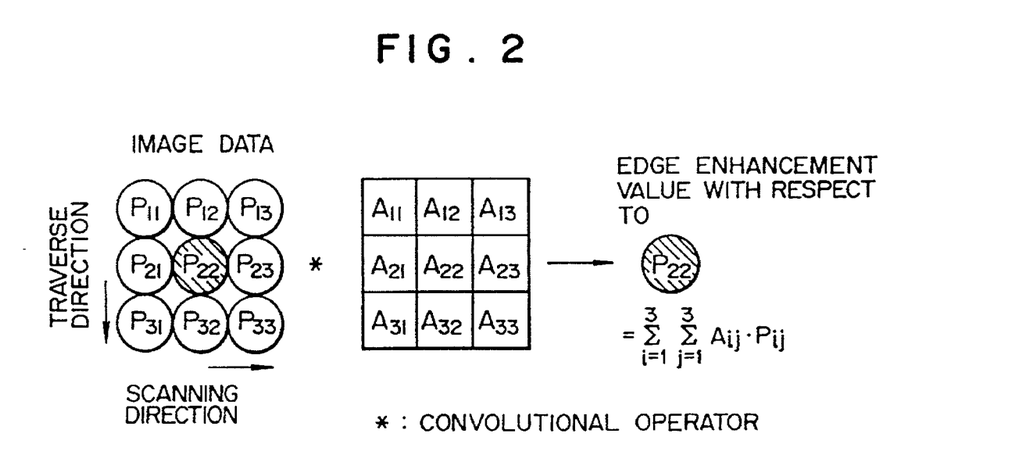
FIG. 2 is a diagram showing an example of calculation made by a filter.

FIG. 2 shows an example of calculation made by a filter. Let us suppose that in a pixel region including three pixels in each of scanning direction and traverse direction, $P_{22}$ is a target pixel data which is to be processed by the filter. It is to be noted that the positions of pixels in a scanning direction are given by j=1 to 3 and the positions of pixels in a vertical scanning direction are given by i=1 to 3. Each pixel data $P_{ij}$ is multiplied by a corresponding filter coefficient $A_{ij}$, and the products thus obtained are summed up to obtain the filter output for the target pixel data $P_{22}$. As is well known, this processing is the convolutional operation in a digital filter.

Figure 3A:
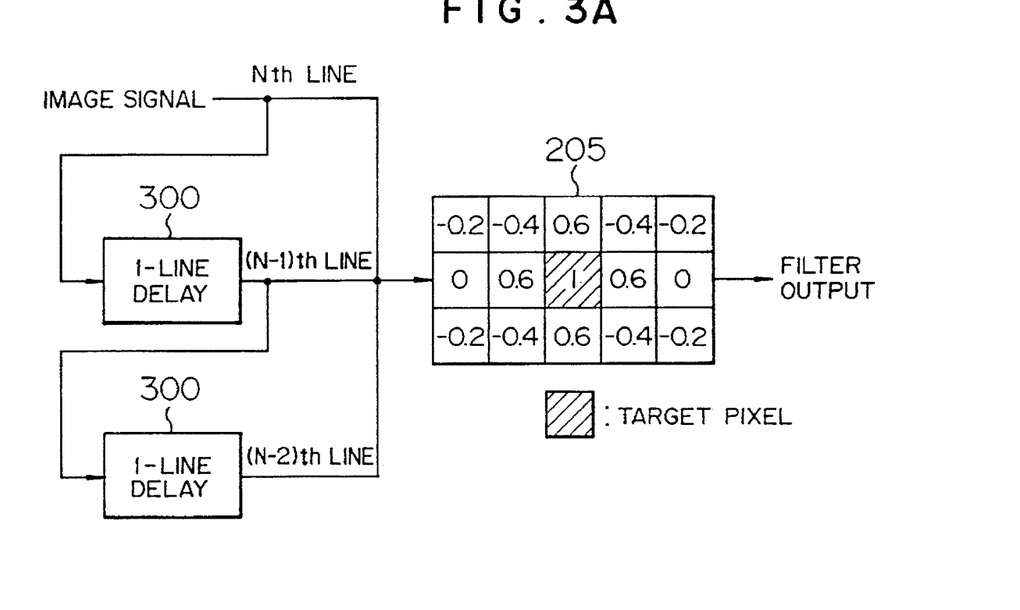
FIGS. 3A to 3C are diagrams for explaining a first example of a dot filter according to the present invention.
Figure 3B:
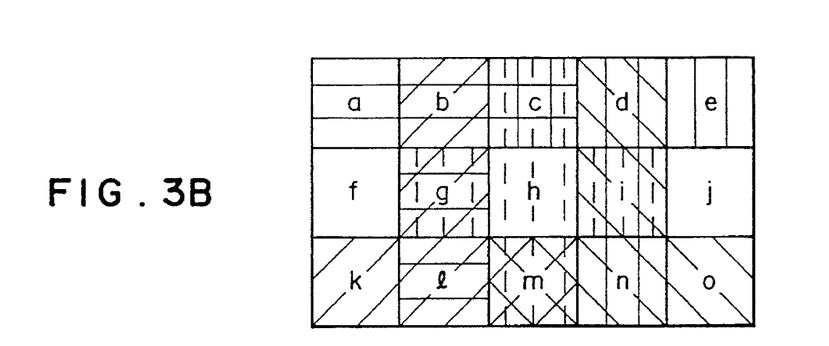
Figure 3C:
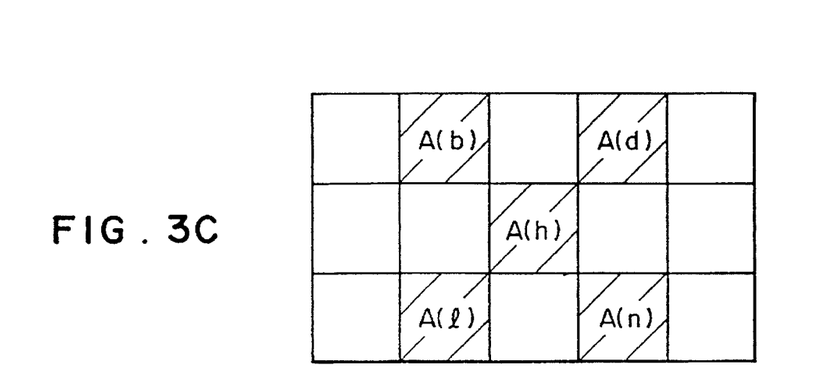
Figure 11:
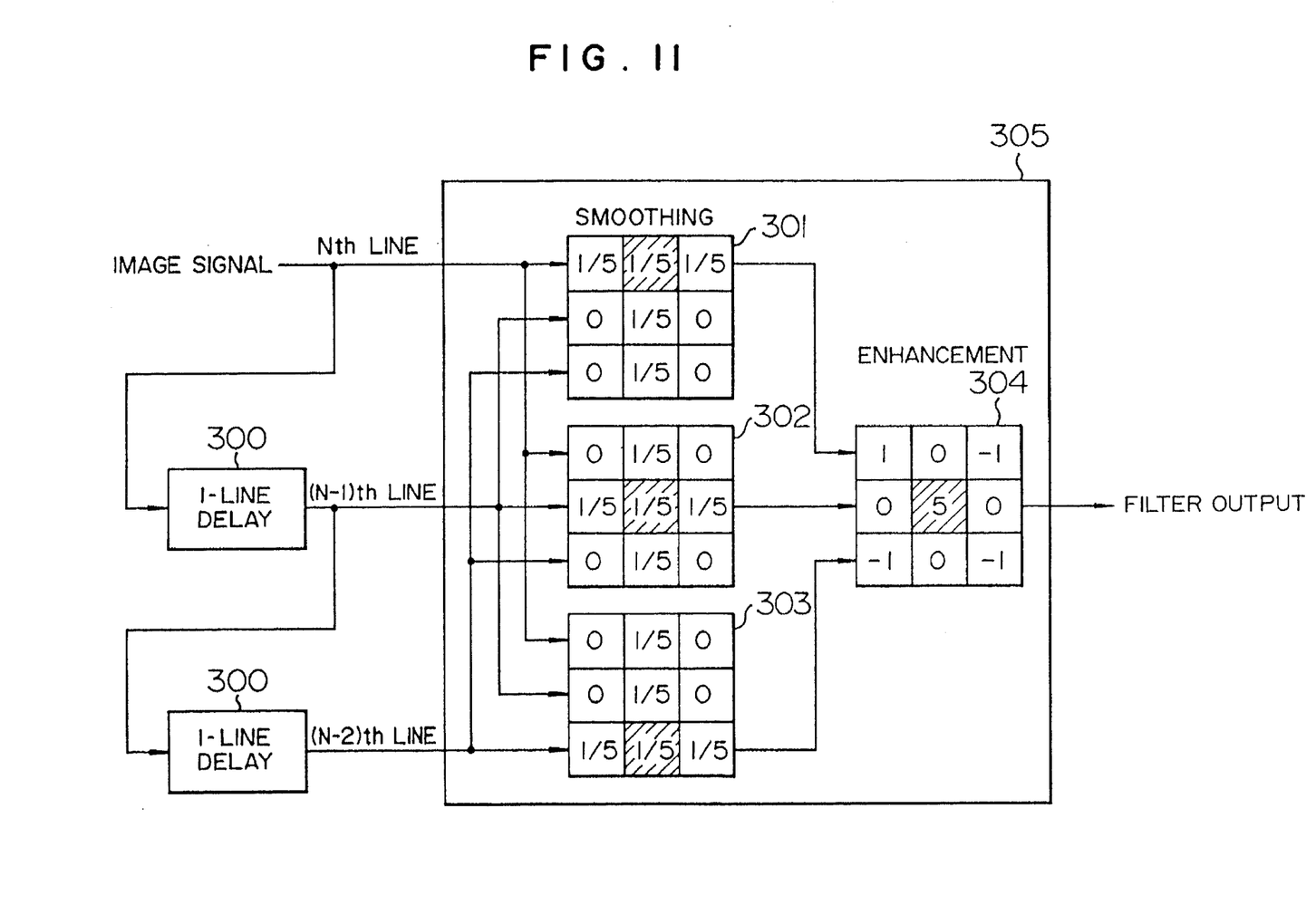
FIG. 11 is a diagram showing a filter group corresponding to the dot filter of FIG. 3A.

FIGS. 3A to 3C are diagrams for explaining a first example of a dot filter according to the present invention, and FIG. 11 is a diagram for explaining the operation of a filter group corresponding to the first example.

In more detail, FIG. 3A shows coefficients of a dot filter 205 (that is, the first example), and FIGS. 3B and 3C show the procedure for obtaining the coefficients of FIG. 3A.

Referring to FIG. 3B, in a region including five pixels in a scanning direction and three pixels in a traverse direction, the mean density of a 5-pixel region is calculated. That is, the mean density $A(b)=(a+b+c+g+l)/5$ of a pixel region which contains a b-pixel as a center pixel, the mean density $A(d)=(c+d+e+i+n)/5$ of a 5-pixel region which contains a d-pixel as a center pixel, the mean density $A(h)=(c+g+h+i+m)/5$ of a 5-pixel region which contains an h-pixel as a center pixel, the mean density $A(l)=(a+g+k+l+m)/5$ of a 5-pixel region which contains an l-pixel as a center pixel, and the mean density $A(n)=(d+i+m+n+o)/5$ of a 5-pixel region which contains an n-pixel as a center pixel, are calculated. For a dot image, these mean density values A(b), A(d), A(h), A(l) and A(n) are nearly equal to one another. Next, as shown in FIG. 3C, an edge enhancement value E(h) with respect to the h-pixel in the region which includes five pixels in a scanning direction and three pixels in a traverse scanning direction, is calculated. This calculation is carried out among the b-pixel, the d-pixel, the h-pixel, the l-pixel and the n-pixel. At this time1 the above-mentioned mean density values A(b), A(d), A(h), A(l) and A(n) are used for calculating the edge enhancement value E(h), which is given by the following equation:

$$E(h)=5A(h)-A(b)-A(d)-A(l)-A(n).$$

Results of such calculation processing are used as the coefficients of the dot filter 205 of FIG. 3A. Thus, this filter 205 has both the smoothing characteristic and the edge enhancement characteristic.

FIG. 11 shows a circuit structure which uses two kinds of filters for smoothing and enhancement and has a same characteristic as that of the filter shown in FIG. 3.

A filter group 305 shown in FIG. 11 is applied with an image signal which is given from the N-th scanning line parallel to a scanning direction, an image signal which is given from the (N-1)th scanning line and has passed through one 1-line delay unit 300, and an image signal which is given from the (N-2)th scanning line and has passed through two 1-line delay unit 300, to deliver the result of calculation for a target pixel on the (N-1)th scanning line. The smoothed output of each pixel on the N-th scanning line is obtained by a filter 301. That is, the density of each of three contiguous pixels on the N-th scanning line is multiplied by ⅕, the density of a pixel which exists on the (N-1)th scanning line and corresponds to the center pixel of the three contiguous pixels, is multiplied by ⅕, and the density of a pixel which exists on the (N-2)th scanning line and corresponds to the above center pixel, is multiplied by ⅕. Five products thus obtained are summed up, to obtain the smoothed output. Similarly, the smoothed output of each pixel on the (N-1)th scanning line is obtained by a filter 302. That is, the density of each of three contiguous pixels on the (N-1)th scanning line, the density of a pixel which exists on the N-th scanning line and corresponds to the center pixel of the three contiguous pixels on the (N-1)th scanning line, and the density of a pixel which exists on the (N-2)th scanning line and corresponds to the above center pixel, are used for smoothing calculation. The smoothed output of each pixel on the (N-2)th scanning line is obtained by a filter 303. That is, the density of each of three contiguous pixels on the (N-2)th scanning line, the density of a pixel which exists on the N-th scanning line and corresponds to the center pixel of the three contiguous pixels on the (N-2)th scanning line, and the density of a pixel which exists on the (N-1)th scanning fine and corresponds to the above center pixel, are used for smoothing calculation. As mentioned above, the smoothing calculation is carriedtout among contiguous pixels arranged in each of scanaing and traverse directions. Accordingly, in a region where high-density pixels are arranged at regular intervals in oblique directions, such as a dot region, the smoothed output of a pixel is given by the mean density of a pixel group which includes the above pixel as a center pixel. On the other hand, a character or line has a plurality of contiguous high-density pixels arranged in scanning and traverse directions. Accordingly, the density of a pixel in the contour portion of the character or line is relatively well maintained, in spite of smoothing processing.

Next, smoothed pixel data on each scanning line are applied to a filter 304, to perform enhancement calculation for the target pixel on the (N-1)th scanning line. That is, the data of the target pixel is multiplied by 5, data of pixels which exist on the N-th scanning line and are adjacent to the target pixel in oblique directions, are multiplied by −1, and data of pixels which exist on the (N-2)th scanning line and are adjacent to the target pixel in oblique directions, are multiplied by −1. The products thus obtained are summed up to obtain the enhancement value of the target pixel. As can be seen from the above, contour enhancement calculation is carried out among pixels arranged in oblique directions. Accordingly, in a region where pixel having the same density are arranged at regular intervals in oblique directions, such as a dot pattern, the above-mentioned products cancel one another, and thus the density of the target pixel is scarcely enhanced. On the other hand, in a character or line, pixels having the same density are contiguously arranged in scanning and traverse directions. Accordingly, the density of a pixel in the contour portion of the character or line is greatly enhanced by the enhancement processing.

The filter group 305 of FIG. 11 includes two kinds of filters, that is, the smoothing filters 301, 302 and 303 and the enhancement filter 304. On the other hand, according to the present invention, as shown in FIGS. 3A to 3C, both the smoothing processing and the enhancement processing are carried out at the same time by the dot filter 205 which includes five pixels in a scanning direction and three pixels in a traverse direction. By making smoothing filter coefficients on each scanning line different from each other, even the dot filter 205 including three pixels in a vertical scanning direction can carry out both the smoothing processing and the enhancement processing. That is, according to the present invention, it is not required to increase the number of line memories for 1-line delay.

Figure 4A:
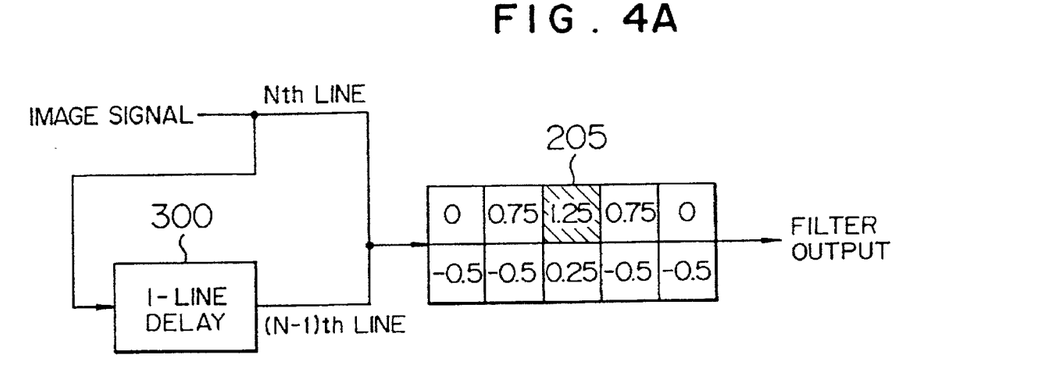
FIGS. 4A to 4C are diagrams for explaining a second example of a dot filter according to the present invention.
Figure 4B:
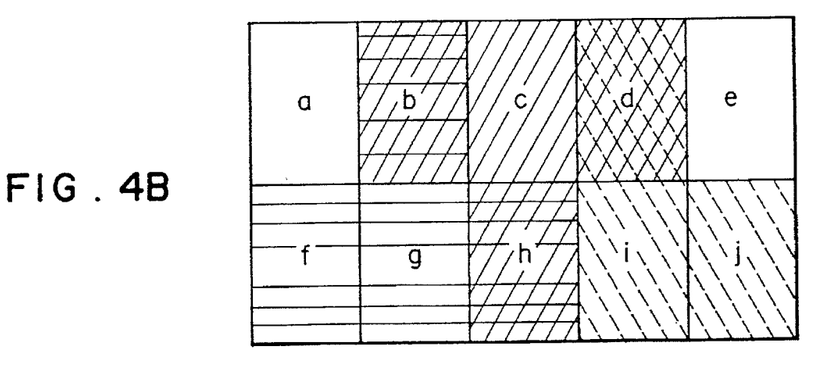
Figure 4C:
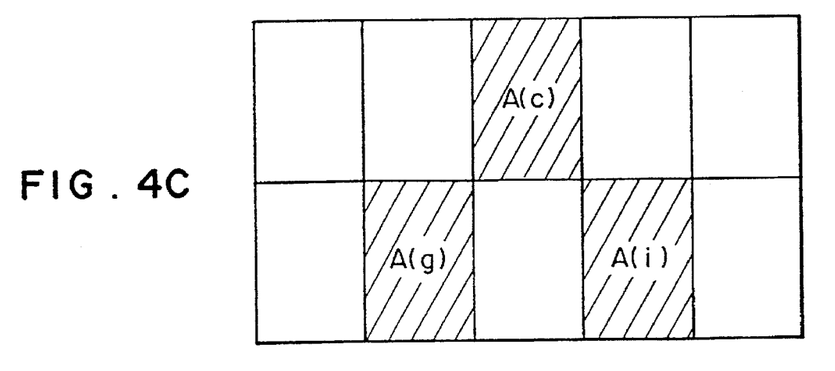
Figure 12:
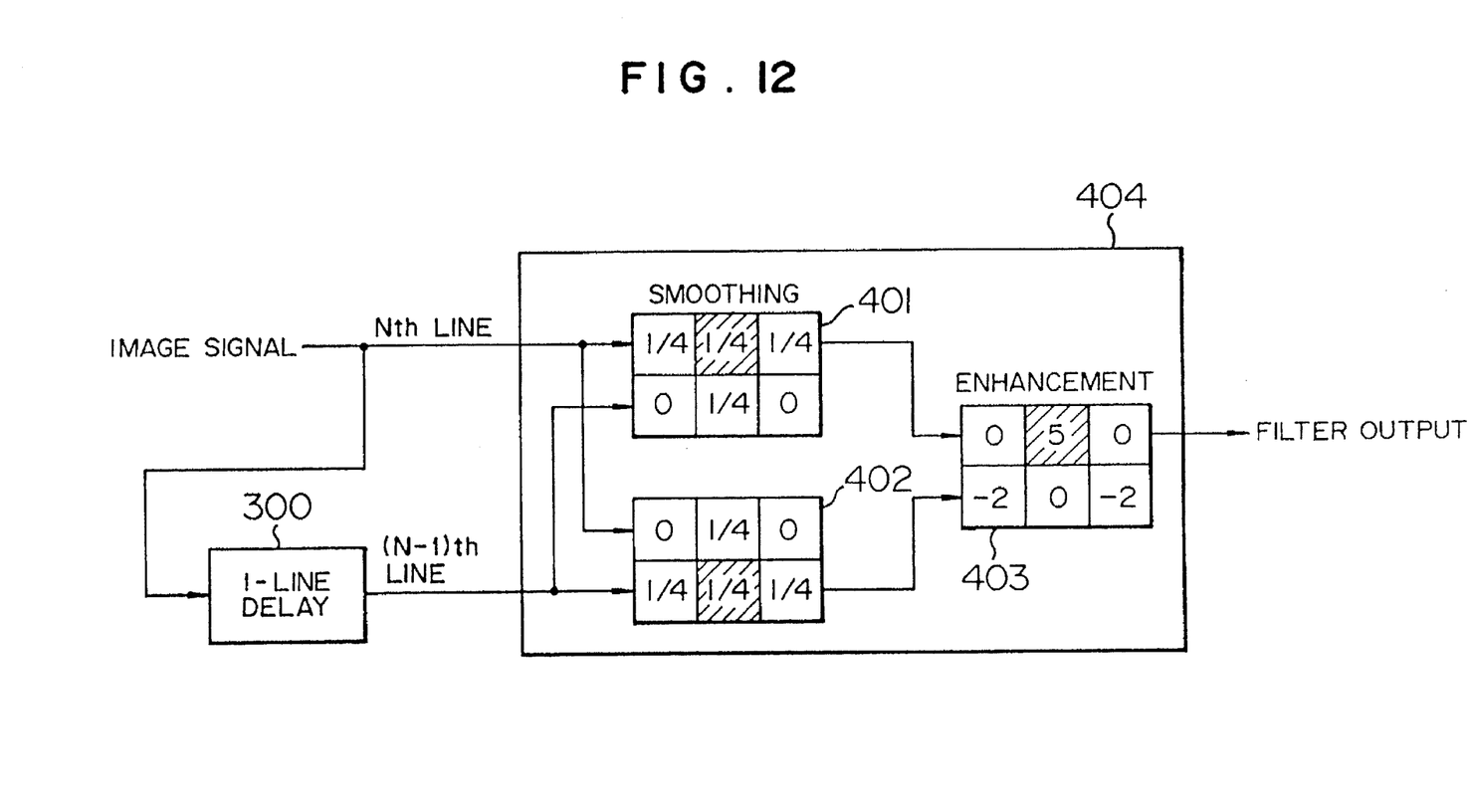
FIG. 12 is a diagram showing a filter group corresponding to the dot filter of FIG. 4A.

FIGS. 4A to 4C are diagrams for explaining a second example of a dot filter according to the present invention, and FIG. 12 is a diagram for explaining the operation of a filter group corresponding to the second example. More specifically, FIG. 4A shows coefficients of a dot filter 205 (that is, the second example), and FIGS. 4B and 4C show the procedure for obtaining the coefficients of FIG. 4A.

Referring to FIG. 4B, in a region including five pixels in a scanning direction and two pixels in a traverse direction, the mean density of a 4-pixel region is calculated. That is, the mean density $A(g)=(b+f+g+h)/4$ of a 4-pixel region which contains a g-pixel as a center line, the mean density $A(c)=(b+c+d+h)/4$ of a 4-pixel region which contains a C-pixel as a center pixel, and the mean density $A(i)=(d+h+i+j)/4$ of a 4-pixel region which contains an i-pixel as a center pixel, are calculated. For a dot image, these means density values $A(c)$, $A(g)$ and $A(i)$ are nearly equal to one another. Next, as shown in FIG. 4C, an edge enhancement value $E(c)$ with respect to the c-pixel in the region which includes five pixels in a scanning direction and two pixels in a traverse direction, is calculated. This calculation is carried out among the c-pixel, the g-pixel, and the i-pixel. At this time, the above-mentioned mean density values $A(c)$, $A(g)$ and $A(i)$ are used for calculating the edge enhancement value $E(c)$, which is given by the following equation:

$$E(c)=5A(c)-2A(g)-2A(i)$$

Results of such calculation processing are used as the coefficients of the dot filter 205 of FIG. 4A. Thus, this filter 205 has both the smoothing characteristic and the contour enhancement characteristic.

FIG. 12 shows a circuit structure which uses two kinds of filters for smoothing and enhancement and has the same characteristics as that of the filter shown in FIG. 4.

A filter group 404 shown in FIG. 12 is applied with an image signal which is given from the N-th scanning line parallel to a scanning direction, and an image signal which is given from the (N-1)th scanning line and has passed 1-line delay unit 300, to deliver the result of calculation for a target pixel on the N-th scanning line. The smoothed output of each pixel on the N-th scanning line is obtained by a filter 401. That is, the density of each of three contiguous pixels on the N-th scanning line is multiplied by ¼, and the density of a pixel which exists on the (N-1)th scanning line and is contiguous to the center pixel of the three contiguous pixels, is multipliedby ¼. Four products thus obtained are summed up, to obtain the smoothed output. Similarly, the smoothed output of each pixel on the (N-1)th scanning line is obtained by a filter 402. That is, the density of each of three contiguous pixels on the (N-1)th scanning line and the density of a pixel which exists on the N-th scanning line and is contiguous to the center pixel of the three contiguous pixels, are used for smoothing calculation. As mentioned above, the smoothing calculation is carried out among contiguous pixels arranged in each of scanning and traverse directions. Accordingly, in a region where high-density pixels are arranged at regular intervals in oblique directions, such as a dot region, the smoothed output of a pixel is given by the mean density of a pixel group which includes the pixel as a center pixel. On the other hand, a character or line has contiguous pixels in scanning and traverse directions. Accordingly, the density of a pixel in the contour portion of the character or line is relatively well maintained, in spite of smoothing processing.

Next, smoothed pixel data on each scanning line are applied to a contour enhancement filter 403, to perform enhancement processing for the target pixel on the N-th scanning line. That is, the data of the target pixel is multiplied by 5, and the data of each of two pixels which exist on the (N-1)th scanning line and are adjacent to the target pixel in oblique directions, is multipliedby −2. Three products thus obtained are summed up, to obtain the enhancement value of the target pixel. As can be seen from above, contour enhancement calculation is carried out among pixels arranged in oblique directions. Accordingly, in a region where pixels having the same density are arranged at regular intervals in oblique directions, such as a dot pattern, the above-mentioned products cancel one another, and thus the density of the target pixel is scarcely enhanced. On the other hand, in a character or line, pixels having the same density are contiguously arranged in scanning and traverse directions. Accordingly, the density of a pixel in the contour portion of the character or line is greatly enhanced by enhancement processing. Further, the filter group 404 includes two kinds of filters, that is, the smoothing filters 401 and 402 and the enhancement filter 403. On the other hand, according to the present invention, both the smoothing processing and the enhancement processing are carried out at the same time by the dot filter 205 which includes five pixels in a scanning direction and two pixels in a traverse direction. By making smoothing filter coefficients on each scanning line different from each other, even the dot filter 205 including two pixels in a traverse direction can carry out both the smoothing processing and the enhancement processing. That is, according to the present invention, it is not required to increase the number of line memories for 1-line delay.

Figure 5:
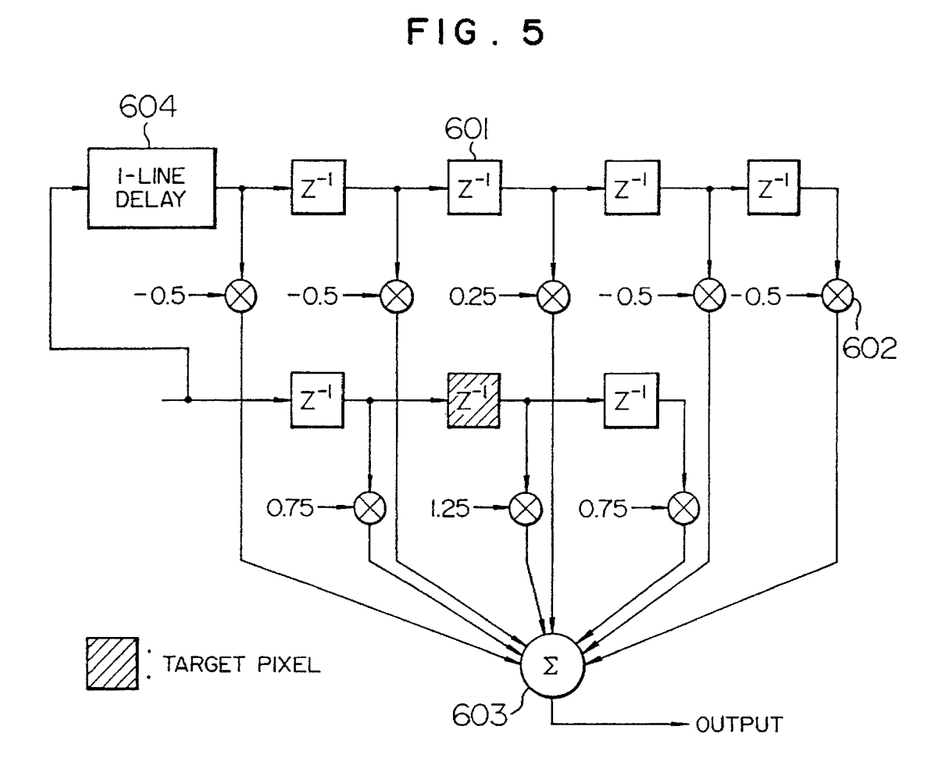
FIG. 5 is a circuit diagram showing the hardware of the second example of FIG. 4A.

FIG. 5 is a block diagram showing the hardware of the dot filter 205 of FIG. 4A.

Referring to FIG. 5, a delay element 601 is used for delaying an image signal by one pixel in a scanning direction, and can be formed of a flip-flop circuit. A multiplier 602 is used for multiplying image data by a filter coefficient, and can be realized by the combination of an adder and a shift register. An adder 603 is used for sunnning up the outputs of multipliers 602. A 1-line delay device 604 is used for storing data on a scanning line which precedes a scanning line having a target pixel, and can be formed of a semiconductor memory. The circuit of FIG. 5 can be formed of digital circuit elements, and can be incorporated in a large scale integration circuit.

Figure 6:
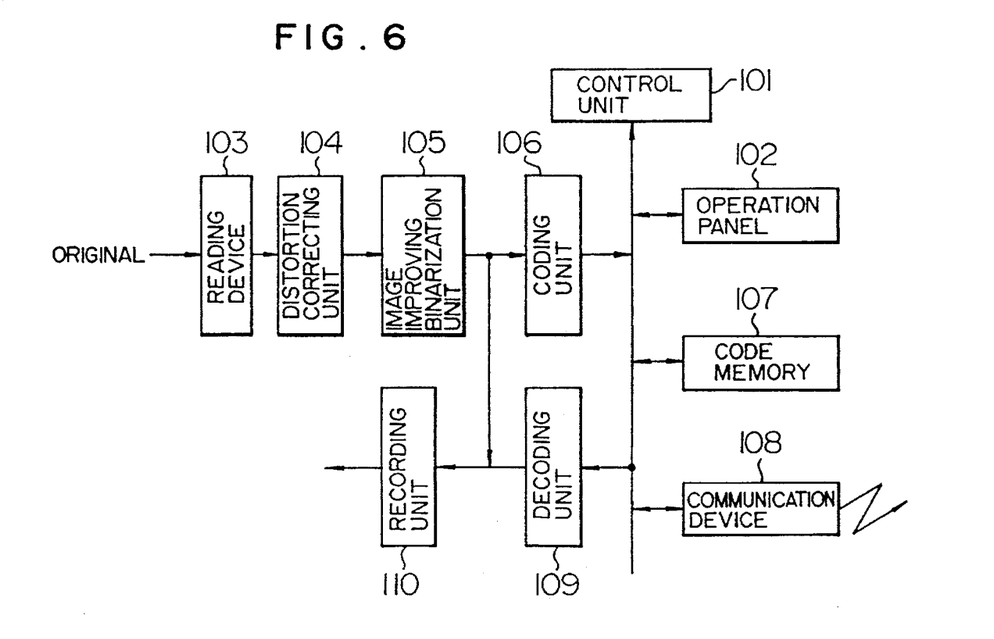
FIG. 6 is a block diagram showing a system which is provided with an image information processor according to the present invention.

FIG. 6 is a block diagram showing the whole construction of an embodiment of facsimile terminal equipment according to the present invention.

Referring to FIG. 6, control unit 101 sends and receives a control signal through a system bus, to control all of the equipment and to carry out the transmission and reception of an image signal and a copying operation. The control unit 101 is formed of, for example, a microprocessor. An operation panel 102 is an interface, by which a user requires the equipment to carry out desired processing, and includes, for example, push buttons for inputting the telephone number of a destination. Reading device 103 generates an image signal by scanning an original matter. The reading device 103 includes, for example, a CCD line sensor as a photoelectric conversion element, and includes a pulse motor for scanning the original. Distortion correcting unit 104 is used to correct the inhomoginity in the output of the reading device 103 and gamma-characteristics, thereby normalizing the image signal. Image improving, binarization unit 105 carries out processing for producing a high-quality output image such as edge enhancement processing and the prevention of a Moiré in a dot region, and further carries out binarization processing. For example, a Laplacian filter may be used for enhancing edges, and a smoothing filter may be used for preventing the generation of a Moiré pattern in the dot region. As to binarization, a binarization method using a single threshold value, and a pseudo gray scale processing method for expressing the tone of an output image (for example, a dithering method or error diffusion method), are known. Coding unit 106 compresses the amount of binary image information, and coding methods such as MH method and MR method are used in the coding unit 106. A code memory 107 serves as means for storing a coded image signal, and can be formed of a semiconductor memory. Communication device 108 sends the codes to a transmission line and for receiving codes from the transmission line. When the transmission line is a telephone line, a modem is used as the communication device 108. Decoding unit 109 decodes the codes which are sent from the code memory 107 through the system bus, to the binary image signal. Recording unit 110 prints out the binary image on a paper, and may include a laser printer. The operation of the present embodiment will be explained below.

(1) Transmission of Document

When an operator sets an original in the reading device 103, sets the telephone number of a destination and desired processing on the panel 102, and then presses a processing start button, the control unit 101 starts image processing. Thus, an image signal from the reading device 103 is normalized by the distortion correcting unit 104, and then converted into binary data by the image improving, binarization unit 105. The binary data is converted by the coding unit 106 into codes, which are stored in the code memory 107. The codes in the code memory 107 are sent to the destination through the communication device 108 and the telephone line.

(2) Reception of Document

Coded data which is sent from the telephone line through the communication device 108, is once stored in the code memory 107. The coded data in the code memory 107 is decoded by the decoding unit 109 to the binary signal, which is printed on recording paper by the recording unit 110.

(3) Copying

When a user sets an original in the reading device 103, sets the telephone number of a destination and desired processing on the panel 102, and then presses the processing start button, the control unit 101 starts image processing. Thus, an image signal from the reading device 103 is normalized by the distortion correcting unit 104, and then converted into binary data by the image improving, binarization unit 105. The binary data is printed on a paper by the recording unit 110.

Figure 7:
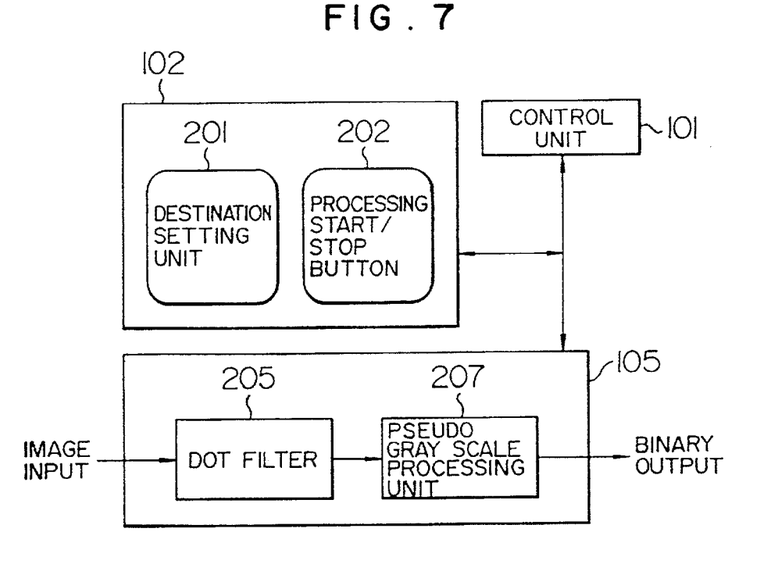
FIG. 7 is a block diagram showing a first embodiment of the combination of an operation panel and image improving, binarization unit which are shown in FIG. 6.

FIG. 7 is a block diagram showing a first embodiment of the combination of the operation panel and the image improving, binarization unit which are used in the facsimile terminal equipment of FIG. 6. Referring to FIG. 7, an operation panel 102 includes destination setting unit 201 and a processing start button 202 for starting or stopping processing. Image improving, binarization unit 105 is made up of a dot filter 205 and pseudo gray scale processing unit 207. The dot filter 205 has the characteristics of FIG. 1, and the pseudo gray scale processing unit 207 is binarization unit capable of realizing pseudo tone expression by using, for example, the dithering method or error diffusion method.

Next, the operation of the first embodiment will be explained.

When image information is transmitted, an original is set in the reading device, the telephone number of a destination is input by the destination setting unit 201 of the operation panel 102, and then the processing start button 202 is pressed. In a case where image information is copied, the original is set in the reading device, and then the processing start button 202 is pressed. Thus, an image signal passes through the dot filter 205, and then binarization capable of realizing pseudo tone expression is carried out for the output of the dot filter 205 by the pseudo gray scale processing unit 207. Thus, the contour portion of a character or figure on the original is emphasized, and a dot-region is smoothed. Accordingly, a high-quality binary output is obtained which is excellent in reproducibility of a character or thin line and can prevent the generation of a Moiré pattern in the dot region. That is, an operator is not required to select one of binarization and pseudo gray scale processing in accordance with a pattern on an original. Thus, there will not arise the following problems of the prior art. That is, when the binarization is selected, the pseudo tone expression for a halftone region becomes impossible. On the other hand, when the pseudo gray scale processing is selected, a character becomes light or blurred, and thus cannot be read.

According to the first embodiment, the operation panel is not required to include a device for selecting one of binarization and pseudo gray scale processing in accordance with a pattern on an original, and moreover the start or stop of transmission can be indicated only by the button 202. Thus, the operation of a user can be simplified.

Next, a second embodiment of the combination of the operation panel and the image improving, binarization unit will be explained, with reference to FIG. 8.

Figure 8:
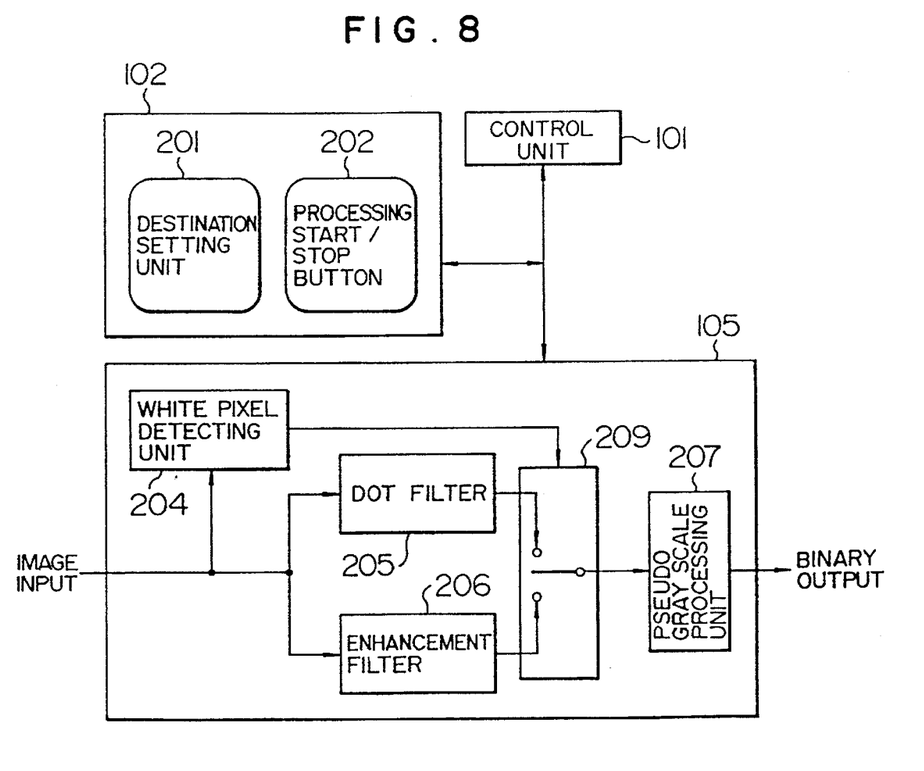
FIG. 8 is a block diagram showing a second embodiment of the combination of an operation panel and image improving, binarization unit.

Referring to FIG. 8, like the first embodiment of FIG. 7, the operation panel 102 includes the destination setting unit 201 and the processing start/stop button 202 for starting or stopping processing. The second embodiment, however, is different from the first embodiment of FIG. 7 in that image improving, binarization unit 105 includes a white pixel detecting unit 204 for detecting a white image in the neighborhood of a target pixel, the dot filter 205, a contour enhancement filter 206 connected in parallel with the dot filter 205 for carrying out contour enhancement no matter whether image information indicates a dot region or a character/figure region, the pseudo gray scale processing unit 207, and a changeover switch 209 for connecting one of the outputs of the filters 205 and 206 to the pseudo gray scale processing unit 207 in accordance with the output of the white pixel detecting unit 204. The white pixel detecting unit 204 may be realized by eight equalizer detectors each formed by a logic circuit. Each of the equalizer detectors has two inputs and one output. The image data of eight peripheral pixels adjacent to a target pixel are input to every input of the eight equalizer detectors. An image data representing a white is input to every other input of the equalizer detectors. The logical sum of the outputs of eight equalizer detectors is the output from the white pixel detecting unit 204.

Next, the operation of the second embodiment will be explained. In a case where image information is transmitted, an original matter is set in the reading device, the telephone number of a destination is input by the destination setting unit 201 of the operation panel, and then the processing start button 202 is pressed. When image information is copied, the original is set in the reading device and then the processing start button 202 is pressed. Accordingly, it is not required to use conventional apparatus for selecting one of binarization and pseudo gray scale processing in accordance of the image information of the original. An image signal passes through the dot filter 205 and the contour enhancement filter 206, and is then applied to the switch 209. When the white pixel detecting unit 204 detects a white image in the neighborhood of a target pixel, it is determined that the target pixel does not exist in a dot region, and thus the output of the contour enhancement filter 206 is applied to the pseudo gray scale processing unit 207 through the switch 209. When the white pixel detecting unit 204 does not detect a white image in the neighborhood of the target pixel, it is judged that the target pixel may exist in a dot region, and thus the output of the dot filter 205 is applied to the pseudo gray scale processing unit 207 through the switch 209. In the pseudo gray scale processing unit 207, binarization capable of realizing pseudo tone expression is carried out. Thus, for other portions of the original than a white portion, a high-quality binary output capable of preventing the generation of a Moiré pattern in a dot region and capable of performing contour enhancement for a character or the like, is obtained, independently of the image information of the original.

As mentioned above, the image improving, binarization unit includes the white pixel detecting unit, the dot filter and the contour enhancement filter, and one of the outputs of the dot filter and the contour enhancement filter is selected in accordance with the presence or absence of the white image. Thus, a character or the like is recorded very clearly.

Figure 9:
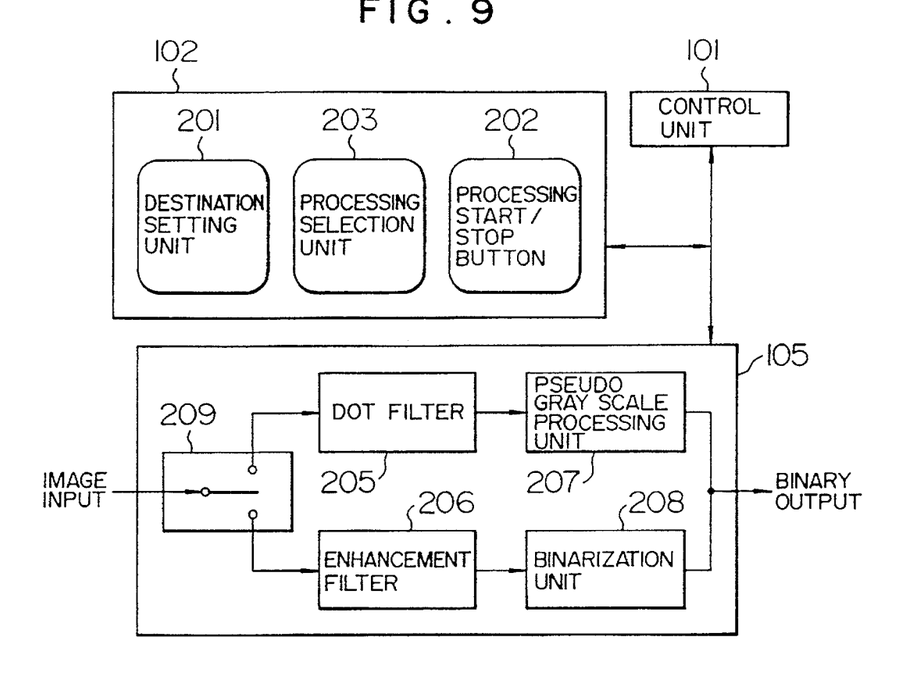
FIG. 9 is a block diagram showing a third embodiment of the combination of an operation panel and image improving, binarization unit.

FIG. 9 is a block diagram for explaining a third embodiment of the combination of the operation panel and the image improving, binarization unit, in detail. Referring to FIG. 9, an operation panel 102 includes the destination setting unit 201, the processing start/stop button 202 and processing selection unit 203. Image improving, binarization unit 105 includes the switch 209, the dot filter 205, the contour enhancement filter 206, the pseudo gray scale processing unit 207, and binarization unit 208. The switch 209 is set by the control unit 101 so that an image signal is sent to one of the pseudo gray scale processing unit 207 and the binarization unit 208 in accordance with processing selected by the processing selection unit 203. The binarization unit 208 carries out binarization by using a constant threshold value. The binary data may be obtained from an output of a comparator which is formed by a logic circuit and has a couple of inputs, one of which receives an image data and another one receives a fixed threshold value.

Next, the operation, of the third embodiment will be explained.

When image information is transmitted, an original is set in the reading device, and the telephone number of a destination is input by the destination setting unit 201 of the operation panel 102. When the original is copied, the inputting of the telephone number is omitted. Next, one of pseudo gray scale processing and binarization is selected by means of the processing selection unit 203, and then the processing start button 202 is pressed. When the pseudo gray scale processing is selected, an image signal is sent through the switch 209 and the dot filter 205 to the pseudo gray scale processing unit 207, in which binarization capable of realizing pseudo tone expression is carried out. Thus, a high-quality binary output is obtained which can produce an output image subjected to contour enhancement and can prevent the generation of a Moiré pattern in a dot region. On the other hand, when the binarization is selected, the image signal is sent through the switch 209 and the contour enhancement filter 206 to the binarization unit 208, in which binarization is carried out. Thus, a clear image can be obtained which is subjected to contour enhancement, and in which a character or the like is not blurred nor become light.

Figure 10:
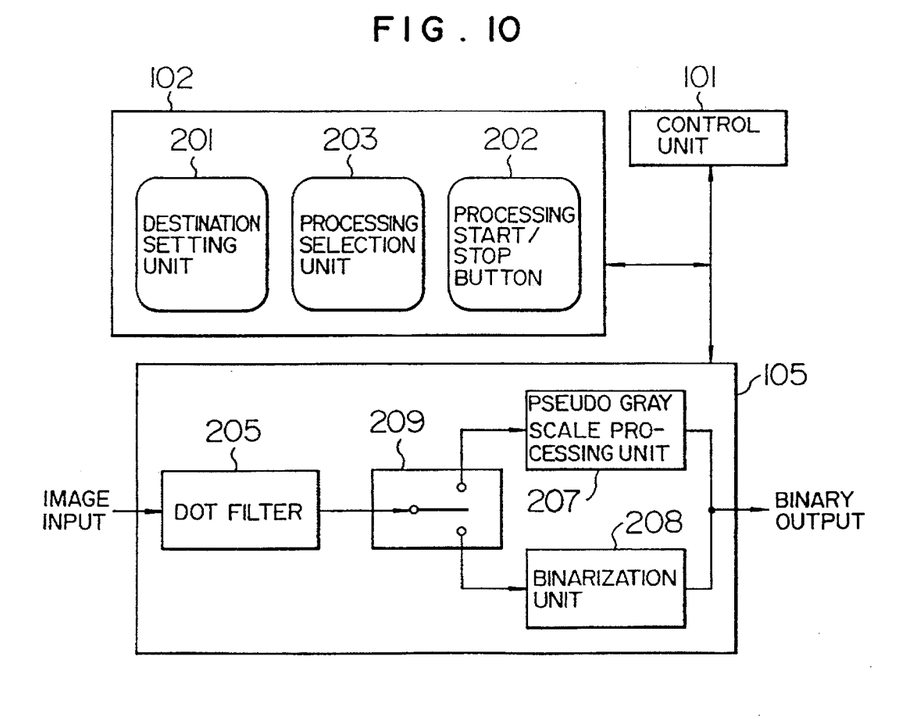
FIG. 10 is a block diagram showing a fourth embodiment of combination of an operation panel and image improving, binarization unit.

FIG. 10 is a block diagram for explaining in detail a fourth embodiment of the combination of the operation panel and the image improving, binarization unit which are shown in FIG. 6. Referring to FIG. 10, the operation panel 102 includes the destination setting unit 201, the processing start button 202 and the processing selection unit 203. Image improving, binarization unit 105 is made up of the switch 209, the dot filter 205, the pseudo gray scale processing unit 207 and the binarization unit 208.

Next, the operation of the fourth embodiment will be explained.

When image information is transmitted, an original is set in the reading device, and the telephone number of a destination is input by the destination setting unit 201 of the operation panel 102. When the original is copied, the inputting of the telephone number is omitted. Next, one of pseudo gray scale processing and binarization is selected by the processing selection unit 203, and then the processing start button 202 is pressed. When the pseudo gray scale processing is selected, an image signal passes through the dot filter 205 and is then applied to the pseudo gray scale processing unit 207, in which binarization capable of realizing pseudo tone expression is carried out. Thus, a binary output image is obtained, in which contour enhancement is carried out and the generation of a Moiré pattern in a dot region is prevented. That is, a clear output image is obtained. In a case where binarization is selected, the image signal passes through the dot filter 205 and is then applied to the binarization unit 208, in which binarization using a constant threshold value is carried out. Thus, a clear output image is obtained, in which the generation of a Moiré pattern in a dot region is prevented, and a character or line does not get blurred nor become light. Further, according to the third and fourth embodiments of FIGS. 9 and 10, the appearance of isolated points due to the generation of a Moiré pattern is suppressed, and thus coding efficiency is improved. Accordingly, a transmission time can be shortened.

According to the present invention, a device for preventing the generation of a Moiré pattern in the dot region of an original and for carrying out contour enhancement for a character or photograph can be formed of simple hardware capable of performing a high-speed operation, and a clear binary output is obtained. Accordingly, it is not required to change either one of binarization and pseudo gray scale processing over to the other in accordance with the image information on an original matter. Further, since the generation of a Moirépattern is prevented and a character or the like does not become light nor blurred, an unnecessary pattern which does not exist on the original, will not be generated, and thus a transmission time is never increased. Further, since a single filter (that is, dot filter) carries out desired processing, it is not required to use a plurality of line memories for discriminating between a character region and a dot region by the image region separation method and for storing these regions, a discriminating logic circuit, and various kinds of filters such as a smoothing filter and a contour enhancement filter. Thus, according to the present invention, facsimile terminal equipment can be made small in size.

We claim:

1. An image information processor for producing a high-quality image for use in a system wherein image information obtained by scanning original matter is improved in image quality, said image information processor comprising a filter which includes:

enhancement filter coefficients having an enhancement peak for enhancing edge areas in a scanning direction or a traverse direction thereof; and smoothing filter coefficients having a smoothing peak for smoothing edge areas in a slant direction across said scanning direction, the image information obtained by scanning said original matter being processed by said filter;

wherein filter processing in accordance with both of said enhancement filter coefficients and said smoothing filter coefficients is performed simultaneously.

2. An image information processor for producing a high-quality output image according to claim 1, wherein said filter includes at least two scanning lines, and each of the scanning lines includes at least five pixels.

3. An image information processor according to claim 1, wherein said filter provides coefficient values to pixels such that coefficients respectively corresponding to a target pixel and pixels connected to said target pixel in the scanning direction and the traverse direction are zero or greater, and coefficients respectively corresponding to any other remaining pixels have negative values.

4. An image information processor for producing a high-quality image for use in a system wherein image information obtained by scanning an original matter is binarized and improved in image quality, said image information processor comprising:

scanning means for scanning the original matter;

means for commanding a start of image processing of the scanned original matter;

white pixel detecting means for detecting a white pixel from image information of the scanned original matter;

means for processing binarization of a pseudo gray scale of the original matter;

a filter including enhancement filter coefficients having an enhancement peak for enhancing edge areas in a scanning direction or a traverse direction thereof of an input image signal of the original matter and smoothing filter coefficients having a smoothing peak for smoothing edge areas in a direction slant across said scanning direction thereof; and a contour enhancement filter, wherein the image information is processed by said contour enhancement filter when the white pixel is detected at a periphery of a target pixel by said white pixel detecting means, the image information is processed simultaneously by said filter having said enhancement peak coefficients and said smoothing peak coefficients when the white pixel is not detected at a periphery of a target pixel by said white pixel detecting means, and an output of said filter is uniformly binarized by said means for processing binarization of pseudo gray scale.

5. An image information processor for producing a high-quality image for use in a system wherein image information obtained by scanning original matter is binarized and improved in image quality, said image information processor comprising:

means for selecting one of simple binarization process and pseudo gray scale processing;

a filter including enhancement filter coefficients having an enhancement peak for enhancing edge areas in a scanning direction or a traverse direction of an input image signal of the original matter and smoothing filter coefficients having a smoothing peak for smoothing edge areas in a direction slant across said scanning direction thereof;

wherein filter processing in accordance with both of said enhancement filter coefficients and said smoothing filter coefficients is performed simultaneously;

means for simple binarization processing; and means for binarizing a pseudo gray scale of the original matter;

wherein all of the image information obtained by the scanning being processed by said filter, and either one of said means for simple binarization processing and said means for finalizing pseudo gray scale being selected for processing on the basis of a command of said selecting means.

6. An image information processor according to claim 5, wherein said filter group provides coefficient values to pixels such that coefficients respectively corresponding to a target pixel and pixels connected to said target pixel in the scanning direction and the traverse direction are zero or greater, and coefficients respectively corresponding to any other remaining pixels have negative values.

7. Facsimile terminal equipment, comprising:

means for scanning and reading original matter and outputting image information; and binarization means for binarizing said image information and transmitting the binarized information, wherein said binarization means comprises a filter which includes:

enhancement filter coefficient having an enhancement peak for enhancing edge areas in a scanning direction or a traverse direction of an input image signal, and smoothing filter coeffients having a smoothing peak for smoothing edge areas in a direction slant across said scanning direction, said binarization means carry out the binarization process after the processing of said image information by said filter group.

8. Facsimile terminal equipment according to claim 7, further comprising white pixel detecting means for detecting a presence or absence of a white pixel in said image information, an output from either one of said filter group having the enhancement peak and the smoothing peak and a contour enhancement filter on the basis of an output of said white pixel detecting means, to thereby carry out pseudo gray scale binarization processing.

9. Facsimile terminal equipment according to claim 7, wherein said filter group provides coefficient values to pixels such that coefficients respectively corresponding to a target pixel and pixels connected to said target pixel in the scanning direction and the traverse direction are zero or greater, and coefficients respectively corresponding to any other remaining pixels have negative values.

10. A filter receiving image information which is obtained by scanning an image of original matter in a main scanning direction and sub scanning direction perpendicular to said main scanning direction, and then outputting processed image information, said filter having:

an enhancement processing filter coefficients; and smoothing processing filter coefficients, said enhancement processing filter coefficients having an enhancement processing characteristic for enhancing the image information corresponding to edge areas of said image successive in a scanning direction or a traverse direction other than the image information corresponding to the other areas of said image, and said smoothing processing filter coefficients having a smoothing processing characteristic for smoothing the image information corresponding to edge areas of said image in a direction slant across said scanning direction other than the image information corresponding to the other areas of said image.

* * * * *